(No Model.)

G. W. HOWELL.
WHEEL.

No. 369,641. Patented Sept. 6, 1887.

Attest
J Watson Sims
Otto Engel

Inventor
George W Howell
by Wood + Boyd
his Attorneys &c

UNITED STATES PATENT OFFICE.

GEORGE W. HOWELL, OF COVINGTON, KENTUCKY.

WHEEL.

SPECIFICATION forming part of Letters Patent No. 369,641, dated September 6, 1887.

Application filed January 22, 1887. Serial No. 225,135. (No model.)

*To all whom it may concern:*

Be it known that I, GEORGE W. HOWELL, a resident of Covington, in the county of Kenton and State of Kentucky, have invented certain new and useful Improvements in Wheels, of which the following is a specification.

My invention relates to an improved wheel, the various features and objects of which will be fully set forth in the description of the accompanying drawings, making a part of this specification, in which—

Figure 1:
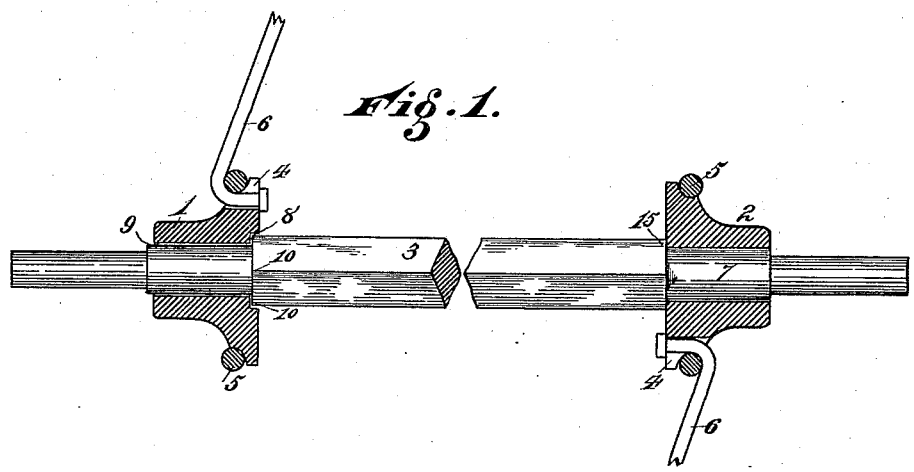
Figure 2:
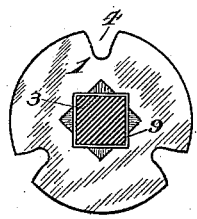
Figure 3:
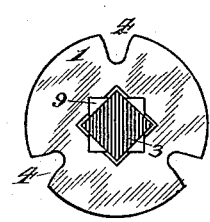
Figure 4:
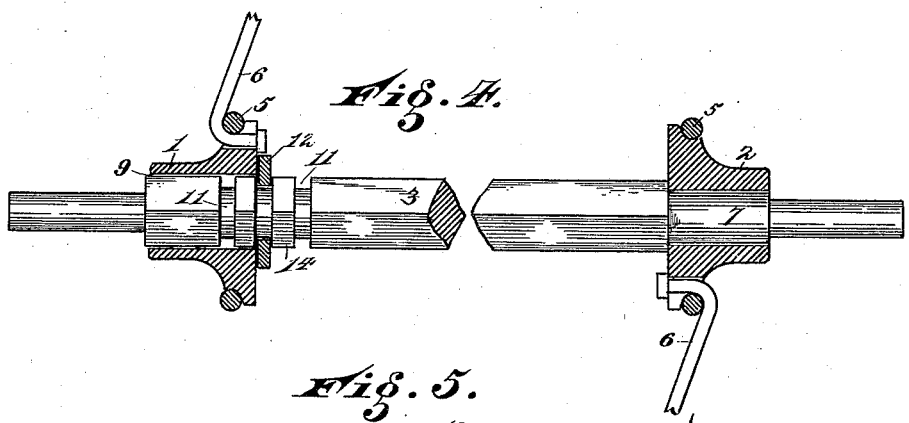
Figure 5:
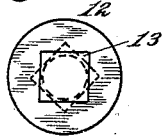

Figure 1 is a longitudinal vertical section of my improvement. Fig. 2 is an elevation of the inner face of the hub, showing the axle in section. Fig. 3 is a modification of the same, showing the employment of a washer. Fig. 4 is a longitudinal central section of said modification, showing the axle in elevation. Fig. 5 is a detail view of the movable part of the hub shown in said modification.

1 represents a wheel-hub; 2, the hub on the opposite end; 3, the axle; 4, notches in the hubs, in which the necks of the spokes rest; 5, the locking-rings; 6, the spokes.

The invention here shown is a novel means of securing the said parts in position, the locking of the parts being accomplished by the following instrumentalities: 15 represents a shoulder upon the axle 3, which abuts against the hub 2. 7 represents an offset in the axle, upon which the hub 2 rests. The axle between the hubs is shown as polygonal or many-sided. Hub 1 is provided with a square orifice, 9, pierced through said hub, the planes of the sides of which orifice are at different angles to the planes of the recess 8, made on the inner face of said hub 1, as shown in Fig. 2. Hub 1 is slid up upon the axle 3 sufficiently close to the hub 2 to allow the spokes and locking-rings to be placed in position. Strain is then applied to the hub 1, forcing it laterally off of the axle until it has passed over the shoulder 10 in said axle, when the axle is turned so that its corners and sides meet or seat in the recess 8, when the strain is released. The strain of the spokes, rims, and fellies holds the parts in position, or they are automatically locked by the recoil caused by the spring or strain of the spokes in their bearings in the rim of the wheel.

I have shown the hubs as composed of the base and the locking-ring 5. I do not wish to limit myself to this peculiar mode of locking or attaching the spokes to the hubs.

In the modification shown in Figs. 3, 4, 5 the construction of hub 2 is the same as that shown in Fig. 1; but the hub 1 is constructed of two pieces instead of one. The inner portion of the hub is turned upon the axle instead of the axle turned within the hubs, as in the former case. This hub may be termed a "washer."

11 represents one or more recesses chased in the axle.

12 represents the movable portion of the hub or collar pierced with a polygonal orifice, 13, which fits and slides upon the axle 3 instead of and in the same manner as hub 1.

Instead of turning the axle 3 to have the square shoulder or shoulders 14 to fit in the recess, as shown in Fig. 1, the axle is stationary, and the collar portion of the hub 12 turns in the recess 11 until its sides are diagonal to the sides of the axle 3, as shown in Fig. 5. When the washer is turned in relation to the axle, as there shown, it locks the hub 1 in position, as the corners of the shoulders bear against the sides of the washer and hold the hubs apart.

I have shown three recesses 11, the inner shoulder, 14, of which serves as an abutment, against which the washer 12 rests to hold the hub 1 away from hub 2 in different positions of adjustment. When it is desired to take either one of these forms of wheels down, strain is applied to the hubs, and the axle in the one case is turned and the washer in the other, until the boundaries of the orifices are brought into planes parallel with the sides of the axle, when they may be slid thereon to bring the hub 1 nearer the hub 2, so that spokes can be released. I have shown the wheel as composed of three sets of double spokes; but any required number, of course, may be employed. By means of the construction here shown the hubs and axles can be readily put together with but little fitting and a stronger device obtained.

The hubs are secured in relative positions apart by first applying an undue strain to allow the turning of the axle or washer portion of the hub, and then released, when the wheel automatically locks itself, obtaining a very cheap, strong, and durable wheel.

Heretofore I have constructed my wheels with an axle having a transverse perforation, collars secured to the spokes and having transverse grooves on their inner faces, and keys which pass down through the axle and rest in the grooves of the collars, as shown in my Patent No. 316,365, dated April 21, 1885. I have also made a wheel consisting of a collar having a flange forming part thereof and constructed with an interior threaded bore, a collar having an attached flange and an interior smooth bore, and a shaft having a screw-thread at one end to engage with the flanged collar, but freely rotating in the smooth bore of the other collar, the spokes being connected at their inner ends to the flanges of the two collars and the shaft by its rotation moving the flanged collar outward to strain the spokes. This construction is shown in my Patent No. 303,853, dated August 10, 1884. Finally, I have employed the construction shown in my Patent No. 356,643, dated January 25, 1887, wherein a wheel-hub is composed of notched disks, a connecting-shaft, and rings resting against shoulders formed on the peripheries of said disks, the hooked spokes engaging the notched disks and rings from their outer sides and having heads lying against the inner sides of said disks, the rings being confined between the disks and the necks of the spokes when the disks are forced apart. I make no claim in this case to these previous constructions.

I claim—

1. A wheel composed of the hubs 1 and 2, one of which is pierced with a many-sided orifice to fit the axle 3, and slides thereon, and the other provided with a smaller orifice abutting against the shoulder of said axle, and the whole secured together by straining the hubs apart and changing the relation of the planes of the sides of the axle and the planes of the sides of the orifice through the axle, substantially as specified.

2. A wheel composed of the axle 3, hub 2, seating thereon and abutting against the shoulder of the axle, and the hub 1, pierced with an orifice the size and shape of said axle, and provided with a many-sided recess, 8, placed on the inner face of said hub and diagonal to the orifice 9, pierced through the hub, substantially as specified.

3. In a wheel, the hub 1, provided with the many-sided orifice 9, adapted to receive the axle, and a similar-shaped recess, 8, formed in the inner face of the hub, with its sides placed diagonal to the sides of said orifice, substantially as specified.

In testimony whereof I have hereunto set my hand.

GEORGE W. HOWELL.

Witnesses:
ROBERT ZAHNER,
M. E. MILLIKAN.